United States Patent [19]

Geissler et al.

[11] Patent Number: 5,138,940
[45] Date of Patent: Aug. 18, 1992

[54] APPLIANCE FOR SPIRALLY SLICING FRUITS AND VEGETABLES
[75] Inventors: Richard L. Geissler, Chippewa Falls; Roger L. Kelly, Eau Claire, both of Wis.
[73] Assignee: National Presto Industries, Inc., Eau Claire, Wis.
[21] Appl. No.: 579,363
[22] Filed: Sep. 7, 1990

Related U.S. Application Data

[63] Continuation-in-part of Ser. No. 555,042, Jul. 18, 1990, Pat. No. 5,089,286.
[51] Int. Cl.⁵ .................... A47J 17/00; A23L 1/212; A23P 1/00
[52] U.S. Cl. ........................................ 99/538; 83/672; 83/733; 83/862; 99/537; 99/584; 99/595
[58] Field of Search .......... 99/485, 495, 509, 537–543, 99/544, 545, 547, 548, 567, 584, 594–599, 636; 83/431, 733, 825.1; 426/615, 637, 512, 518

[56] References Cited

U.S. PATENT DOCUMENTS

| | | |
|---|---|---|
| 2,156,645 | 5/1939 | Waller . |
| 2,464,993 | 3/1949 | Ross . |
| 2,489,581 | 11/1949 | Mason . |
| 2,508,868 | 5/1950 | Ross . |
| 2,715,927 | 8/1955 | Cüpper . |
| 3,058,149 | 10/1962 | Schmid et al. . |
| 3,125,883 | 3/1964 | Wollner . |
| 3,159,195 | 12/1964 | Loveland . |
| 3,162,225 | 12/1964 | Loveland . |
| 3,164,183 | 1/1965 | Kirkpatrick . |
| 3,211,202 | 10/1965 | Mason . |
| 3,285,388 | 11/1966 | Armstrong . |
| 3,310,084 | 3/1967 | Anderson et al. . |
| 3,357,469 | 12/1967 | Pease et al. . |
| 3,434,517 | 3/1969 | Durard, Jr. et al. . |
| 3,452,794 | 7/1969 | Cooke et al. . |
| 3,505,731 | 4/1970 | Giangiulio . |
| 3,607,316 | 9/1971 | Hume . |
| 3,610,303 | 10/1971 | Loveland . |
| 3,696,847 | 10/1972 | Erekson et al. . |
| 3,847,259 | 4/1975 | Chambos et al. . |
| 3,936,934 | 2/1976 | Bowden . |
| 3,952,621 | 4/1976 | Chambos . |
| 4,216,712 | 2/1980 | Altman . |
| 4,348,950 | 9/1982 | Harris . |
| 4,363,266 | 12/1982 | Tichy et al. . |
| 4,387,111 | 6/1983 | Müllender . |
| 4,457,222 | 7/1984 | Finkel . |
| 4,581,990 | 4/1986 | Matsumoto . |
| 4,596,073 | 6/1986 | Ewald . |
| 4,619,192 | 10/1986 | Cycyk . |
| 4,628,808 | 12/1986 | Simon . |
| 4,704,959 | 11/1987 | Scallen . |
| 4,738,195 | 4/1988 | Berube et al. . |
| 4,763,414 | 8/1988 | McNeill, II . |
| 4,765,234 | 8/1988 | Cailliot . |
| 4,787,303 | 11/1988 | Akesson . |
| 4,926,726 | 5/1990 | Julian . |

FOREIGN PATENT DOCUMENTS

| | | |
|---|---|---|
| 1225910 | 9/1924 | Canada . |
| 1024046 | 1/1976 | Canada . |
| 3046923 | 7/1982 | Fed. Rep. of Germany . |
| 3708265 | 3/1987 | Fed. Rep. of Germany . |
| 575059 | 7/1924 | France . |
| 21138 | of 1893 | United Kingdom . |

OTHER PUBLICATIONS

Nemco Spiral Fry TM publication, 2 pages, labelled Exhibit AB.
Six photographs of a product labelled Nemco, date unknown.
Norpro document, entitled "Coily-Q Potato Cutter For Spiraled French Fried Potates", 2 pages, (Exhibit A), date unknown.
Twelve photographs of a device labelled "White Mountain", and Apple Parer Corer Slicer, (Exhibit B), date unknown.

Primary Examiner—Timothy F. Simone
Attorney, Agent, or Firm—Merchant, Gould, Smith, Edell, Welter & Schmidt

[57] ABSTRACT

An electrical appliance for slicing fruits and vegetables which includes (i) a container defining a retention compartment configured and arranged for retention of an article of produce, (ii) a means for rotating the article of produce retained within the container, (iii) a longitudinally reciprocable blade assembly positioned within said rentention compartment for slicing, slicing and coring or grating the article of produce retained within the retention compartment as the article of produce is rotated by said rotating means and the blade assembly is longitudinally propeled against the article of produce.

8 Claims, 9 Drawing Sheets

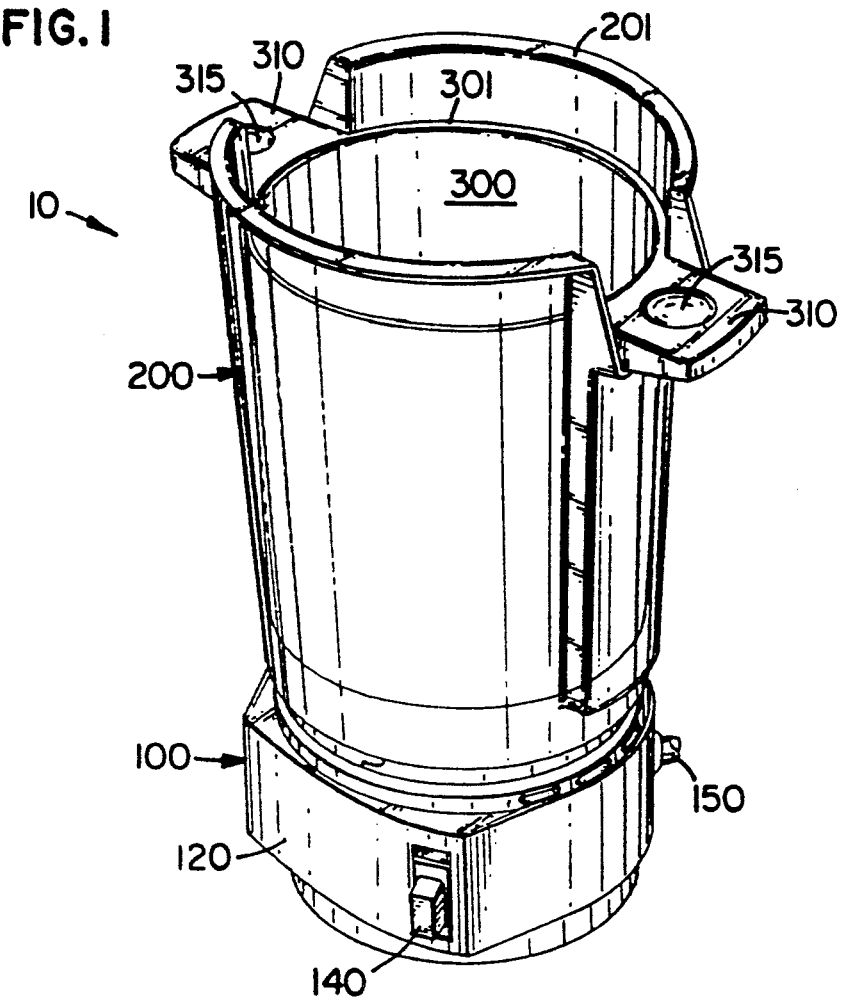
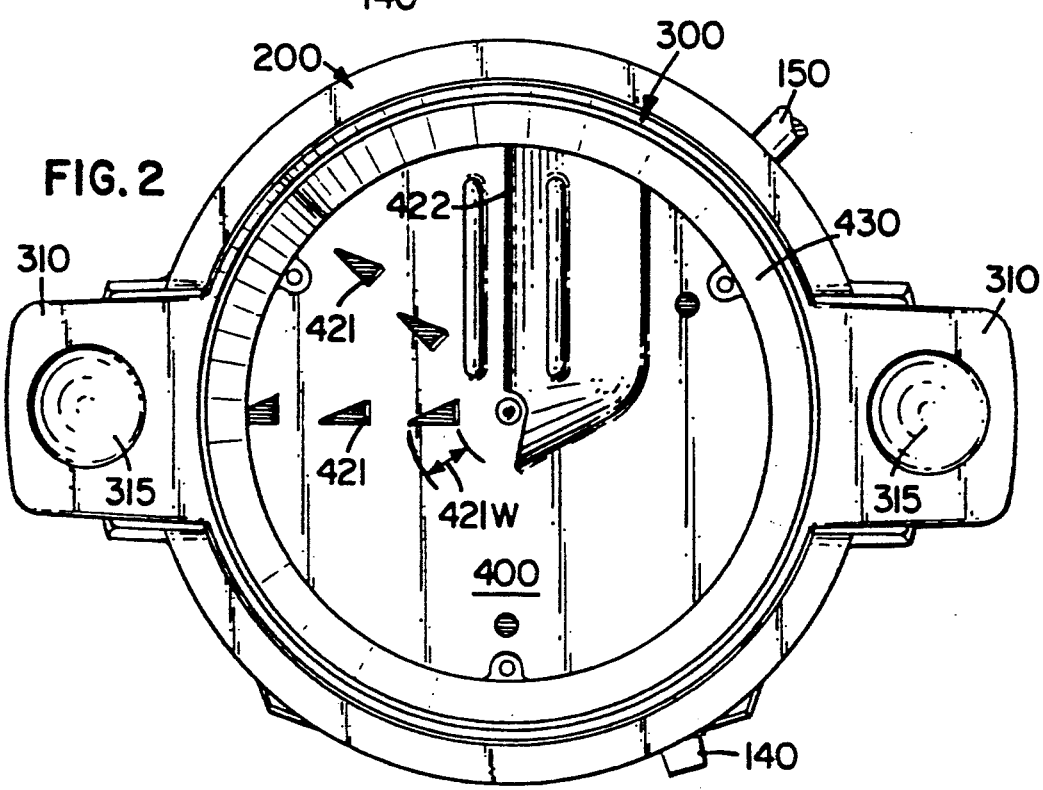

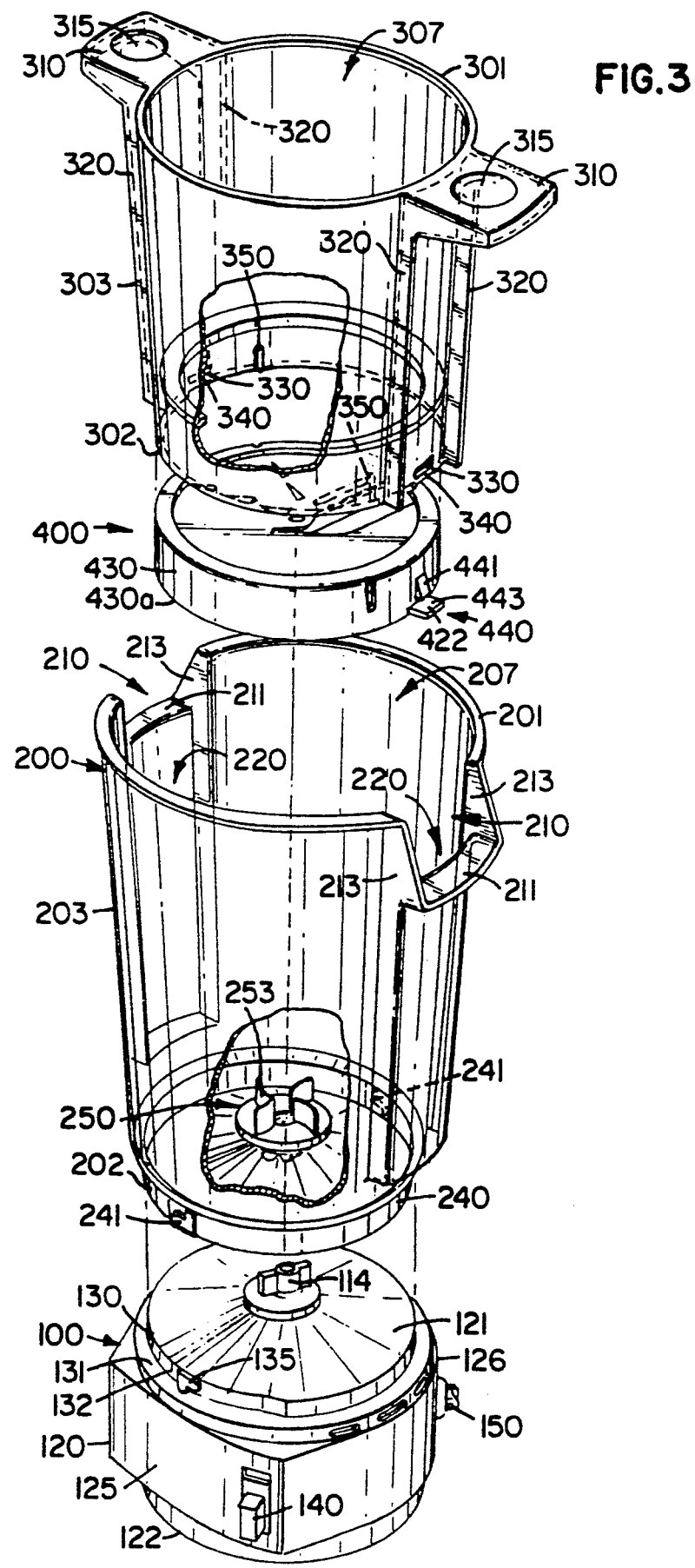

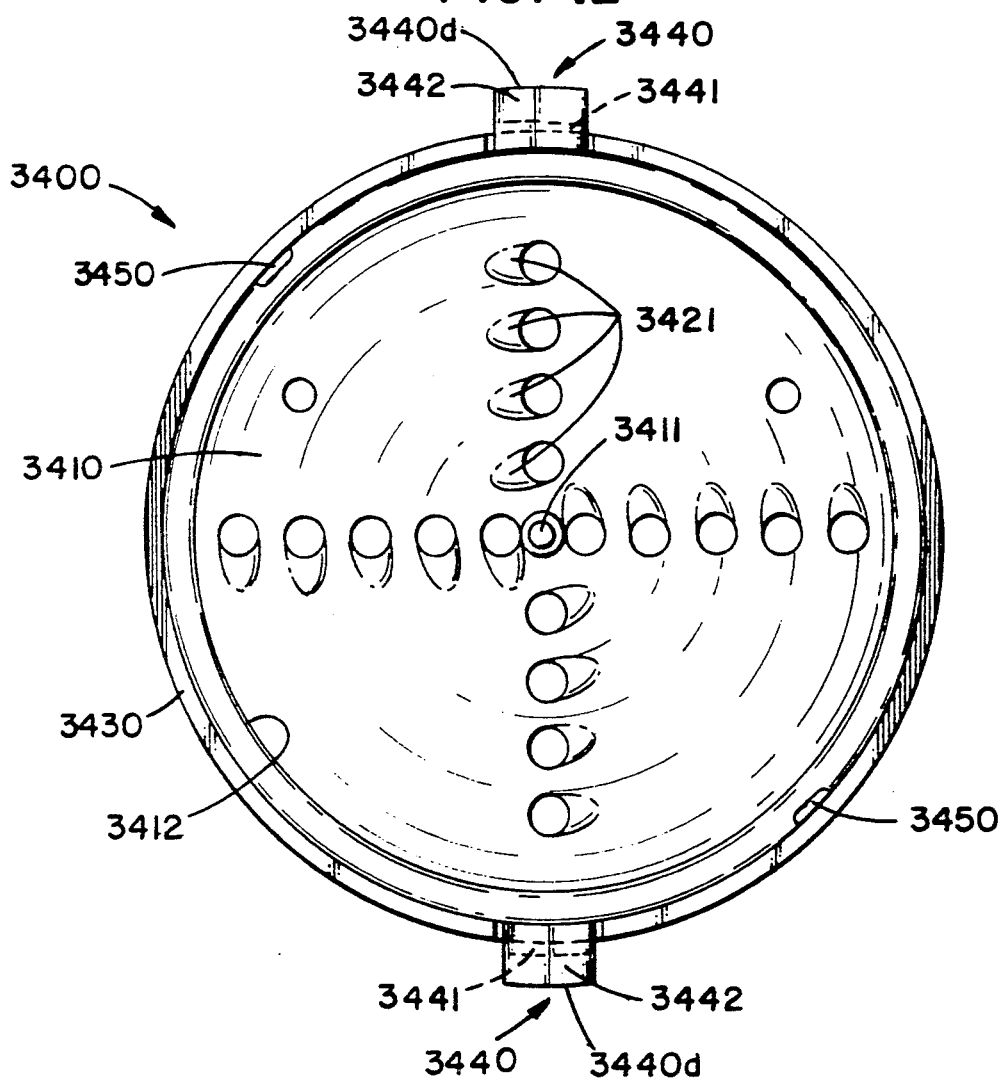

APPLIANCE FOR SPIRALLY SLICING FRUITS AND VEGETABLES

This application is a continuation in part of pending U.S. patent application Ser. No. 07/55,042, filed Jul. 18, 1990 now issued as U.S. Pat. No. 5,089,286, on Feb. 18, 1992.

FIELD OF THE INVENTION

A first embodiment of the invention relates to devices for slicing fruits and/or vegetables into helical segments. A second embodiment of the invention relates to devices which both core and slice fruits and/or vegetables into helical segments.

BACKGROUND OF THE INVENTION

The spiral slicing of fruits and vegetables such as apples, eggplant, onions, peppers, potatoes, radishes, tomatoes, and the like is known to produce an aesthetically pleasing product. Generically, fruits and vegetables which do not require coring, such as potatoes, are sliced into spiral segments by rotating and advancing the fruit/vegetable against a blade assembly.

Samson et al. (Canadian Patent Number 1,225,910) describes an apparatus for helically cutting potatoes which includes a rotating blade assembly, a plurality of inwardly biased fingers for retaining a potato above the rotating blade assembly, and a plunger for forcing the potato retained by the fingers against the rotating blade assembly.

Chambos et al. (U.S. Pat. No. 3,874,259 and Canadian Patent Number 1,024,046) describes an apparatus for helically cutting potatoes which includes a portable power drill slidably mounted upon a base for engaging a stationary blade assembly positioned at one end of the base. In operation, a potato is rotatably supported between a set of prongs retained within the collar of the drill and an axial pin extending from the center of the blade assembly, the potato is rotated by the drill, and the potato manually advanced against the stationary blade assembly.

Ross (U.S. Pat. No. 2,508,868) describes a hand operable utensil for helically cutting vegetables which includes a base having a shaft threadably engaged at one end and a blade assembly engaged at the other end. In operation a potato is supported on the distal end of the shaft and simultaneously rotated and advanced against the blade assembly by rotation of the shaft.

German Patents Numbers 3,046,923 and 3,708,264 describe hand operable utensils for spirally cutting fruits and vegetables. The utensils include a shank threaded along the distal end for producing an axial advance into the fruit/vegetable and a blade extending transversely from the shank for cutting the fruit/vegetable as the utensil advances through the fruit/vegetable.

Mullender (U.S. Pat. No. 4,387,111) describes of spiral slicing of a potato by rotating the potato against a tensioned wire(s).

Cupper et al. (U.S. Pat. No. 2,715,927) describes an appliance for dicing onions which includes a rotatable blade assembly having both vertical and horizontal blades and an independently rotatable hopper above the blade assembly. Operation of the appliance includes the steps of (i) placing an onion in the hopper, (ii) rotating the blade assembly against the lower surface of the onion so as to score the onion in a first direction with the vertical blades, (iii) rotating the hopper so as to lift and rotate the onion 90° with respect to the blade assembly, (iv) continuing rotation of the blade assembly to score the onion in a second direction with the vertical blades transverse to the first direction, and then (v) removing the twice scored portion of the onion with the horizontal blade.

Similarly, fruits and vegetables which require coring, such as apples, are sliced into spiral segments by coring the fruit/vegetable with a coring blade, such as a tube sharpened at one end, and then rotating and advancing the cored fruit/vegetable against a slicing blade assembly.

Pease et al. (U.S. Pat. No. 3,357,469) discloses a machine for spirally slicing previously cored apples which includes a means for holding an apple in a stationary position, a disc with a radial cutting blade, and a motor for rotating the disc relative to the stationary apple.

Tichy et al. (U.S. Pat. No. 4,363,266) discloses a machine for circularly slicing and then coring apples which includes (i) a series of transversely spaced, arcuate blades, (ii) a rotatable table for rotating apples retained along the periphery of the table into engagement with the series of blades, (iii) a rotatable fork for rotating the apples engaged by the blades so as to complete a circular cut along the periphery of the apples, and (iv) a reciprocable coring tube with a sharpened upper end for coring the sliced apples.

Altman (U.S. Pat. No. 4,216,712) discloses a machine for coring fruit, such as grapefruit, which includes a reciprocating and rotating coring tube with a sharpened end.

Durand Jr. et al. (U.S. Pat. No. 3,434,517) discloses a machine for coring pimento peppers which includes a plurality of reciprocating and rotating coring tubes having a sharpened end.

Kirkpatrick (U.S. Pat. No. 3,164,183) discloses a machine for paring and coring fruits and vegetables which includes a motor with a tapered tap and a blade mounted on the distal end of the drive shaft.

Erekson et al. (U.S. Pat. No. 3,696,847) discloses a machine for simultaneously slicing and coring apples which includes a cluster of radially extending reciprocable blades for slicing the apples into a plurality of wedges and a rotatable and reciprocable knife retained within a protective sheath for coring the apples.

While generally effective for helically slicing or slicing and coring fruits and/or vegetables, previous devices such as those summarized above are generally awkward, cumbersome, messy, and/or expensive to manufacture.

Accordingly, a need exists for an appliance which can quickly, easily, cleanly and efficiently slice and/or core fruits and vegetables into spiral segments.

SUMMARY OF THE INVENTION

I have discovered an appliance which can quickly, easily, cleanly and efficiently slice and/or core a fruit or vegetable into spiral segments.

First Embodiment

A first embodiment of the appliance includes (i) a frame accessible through the top and defining a retention compartment, (ii) a container configured for telescoping reception within the retention compartment through the top of the frame and defining a retention chamber, (iii) a means for rotating produce contained within the retention compartment, and (iv) a blade assembly operably coupled to the container for slicing produce contained within the retention compartment of the frame when the container is telescopingly inserted within the retention compartment and the produce is rotated by the rotating means.

The appliance is configured such that the produce passes from the retention compartment of the frame through the base of the container and into the retention chamber defined by the container such that the sliced produce may be easily removed from the retention compartment along with the container.

The appliance permits slicing of produce by simply (i) rotating a vertically mounted article of produce about a vertical axis, (ii) slicing the rotating article of produce from top to bottom in a downwardly spiralling fashion, and (iii) directing the sliced produce into a container positioned immediately above the rotating article of produce as the article of produce is being sliced.

Second Embodiment

A second embodiment of the appliance includes (i) a container defining a retention compartment which is operable for retaining an article of produce, (ii) a means for rotating the article of produce retained within the retention compartment, and (iii) a blade assembly retained within the container which divides the retention compartment into first and second portions and is operable for (-) longitudinally reciprocating within the retention compartment, (ii) slicing and/or coring the article of produce retained within the first portion of the retention compartment when the blade assembly is longitudinally advanced towards the article of produce and the article of produce is rotated by the rotating means, and (-) permitting passage of the sliced and/or cored article of produce through the blade assembly from the first portion of the retention compartment to the second portion of the retention compartment.

The second embodiment of the appliance permits slicing of an article of produce by simply (i) rotating a vertically mounted article of produce within a container, (ii) advancing a blade assembly which divides the container into an upper and a lower portion against the bottom of the rotating article of produce so as to slice the article of produce from bottom to top in an upwardly spiralling fashion, and (iii) directing the sliced produce through the blade assembly whereby the article of produce is retained within the upper portion of the container while the sliced produce is retained within the lower portion of the container.

Blade Assemblies

Slicing of a fruit or vegetable which does not require coring may be achieved by a blade assembly which includes a plurality of radially separated longitudinally extending blades and a single longitudinally gaped radially extending blade.

Slicing of a fruit or vegetable which requires coring may be achieved by utilizing a blade assembly which includes (-) a central orifice which defines an inner periphery, (-) at least one longitudinally extending blade located proximate the inner periphery, and (-) a longitudinally gaped radially extending blade which extends outward from the inner periphery.

BRIEF DESCRIPTION OF THE DRAWINGS

FIG. 1 is a perspective view of a first embodiment of the invention.

FIG. 2 is a top view of the invention embodiment depicted in FIG. 1.

FIG. 3 is an exploded perspective view of the invention embodiment depicted in FIG. 1.

FIG. 12 is a top view of a grating blade assembly useful in the present invention.

DETAILED DESCRIPTION OF THE INVENTION INCLUDING A BEST MODE

Construction

Figure 4:
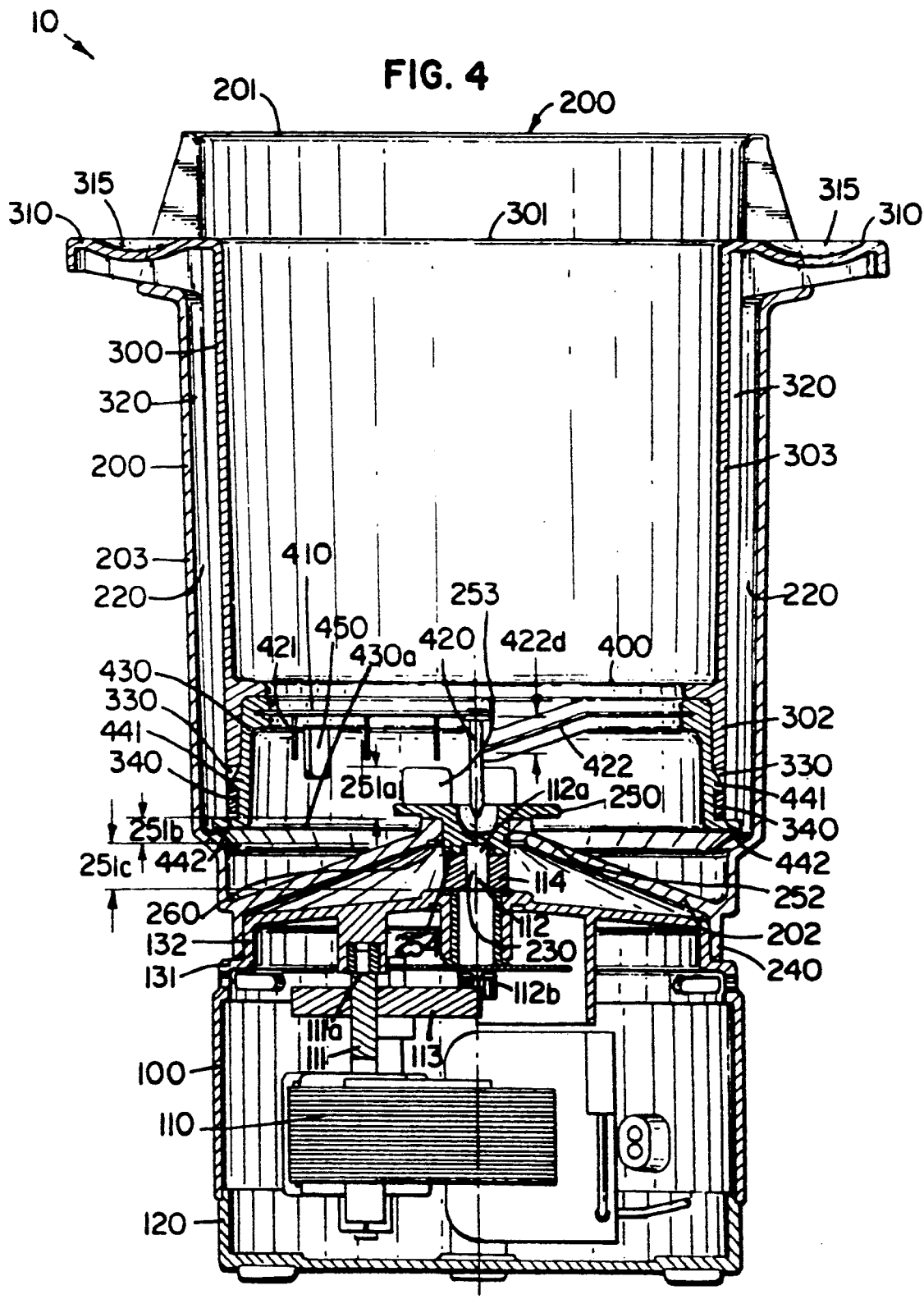
FIG. 4 is a cross-sectional side view of the invention embodiment depicted in FIG. 1.
Figure 5:
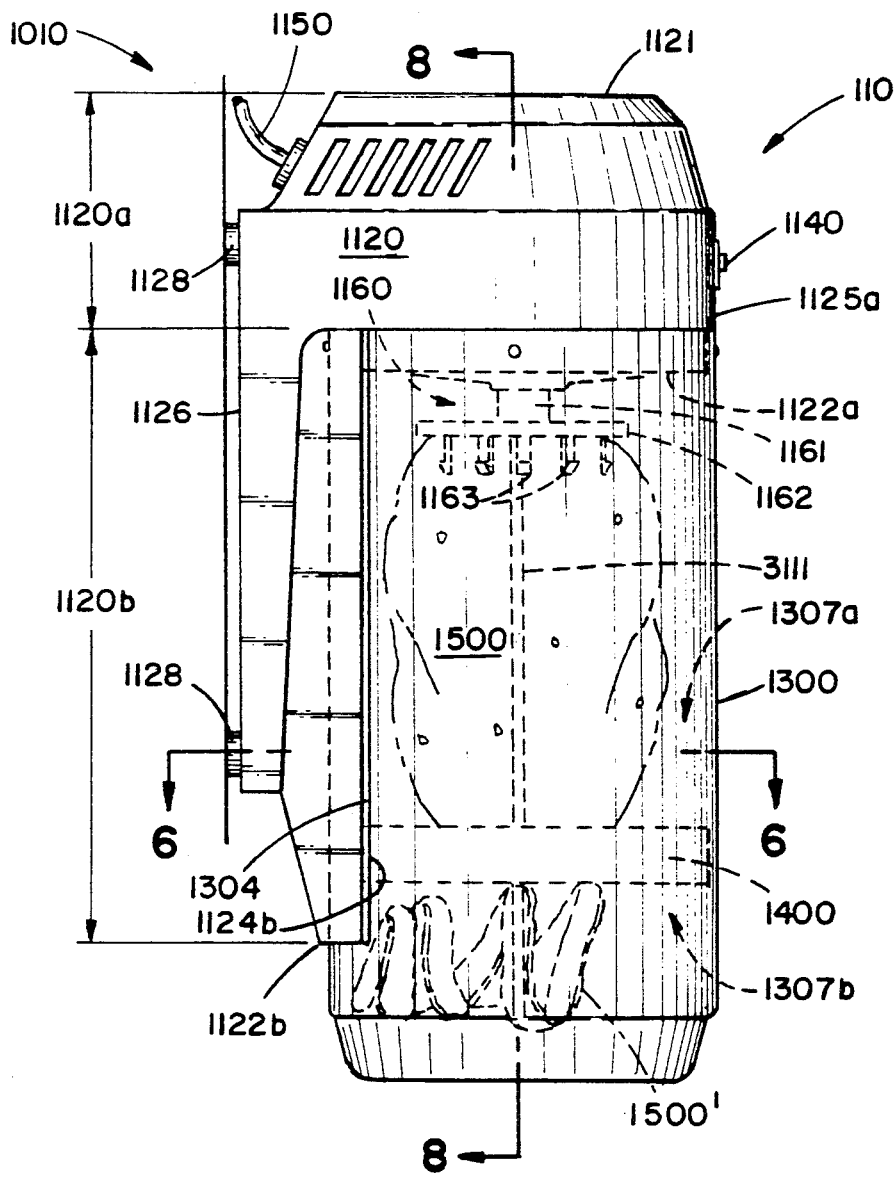
FIG. 5 is a side view of a second embodiment of the invention.
Figure 6:
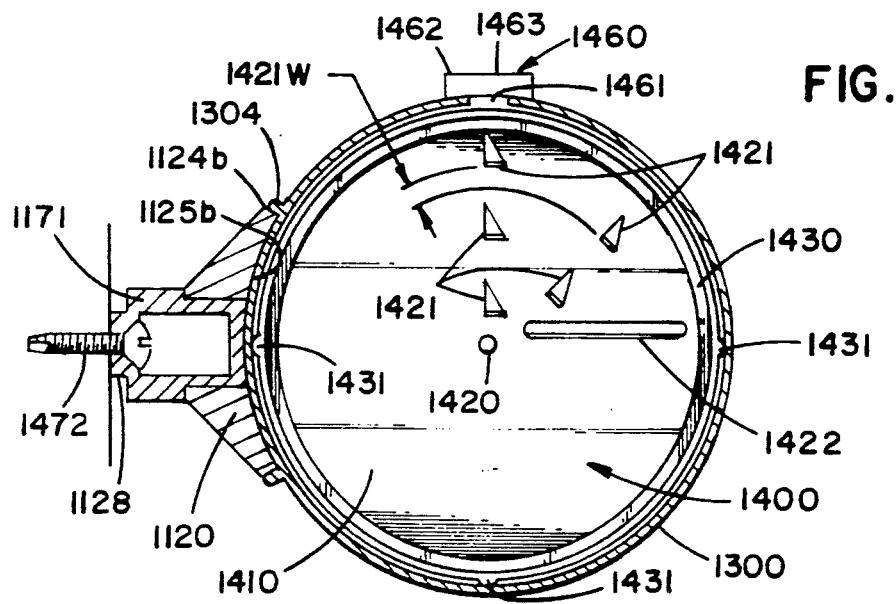
FIG. 6 is a cross-sectional top view of the invention embodiment depicted in FIG. 5.
Figure 7:
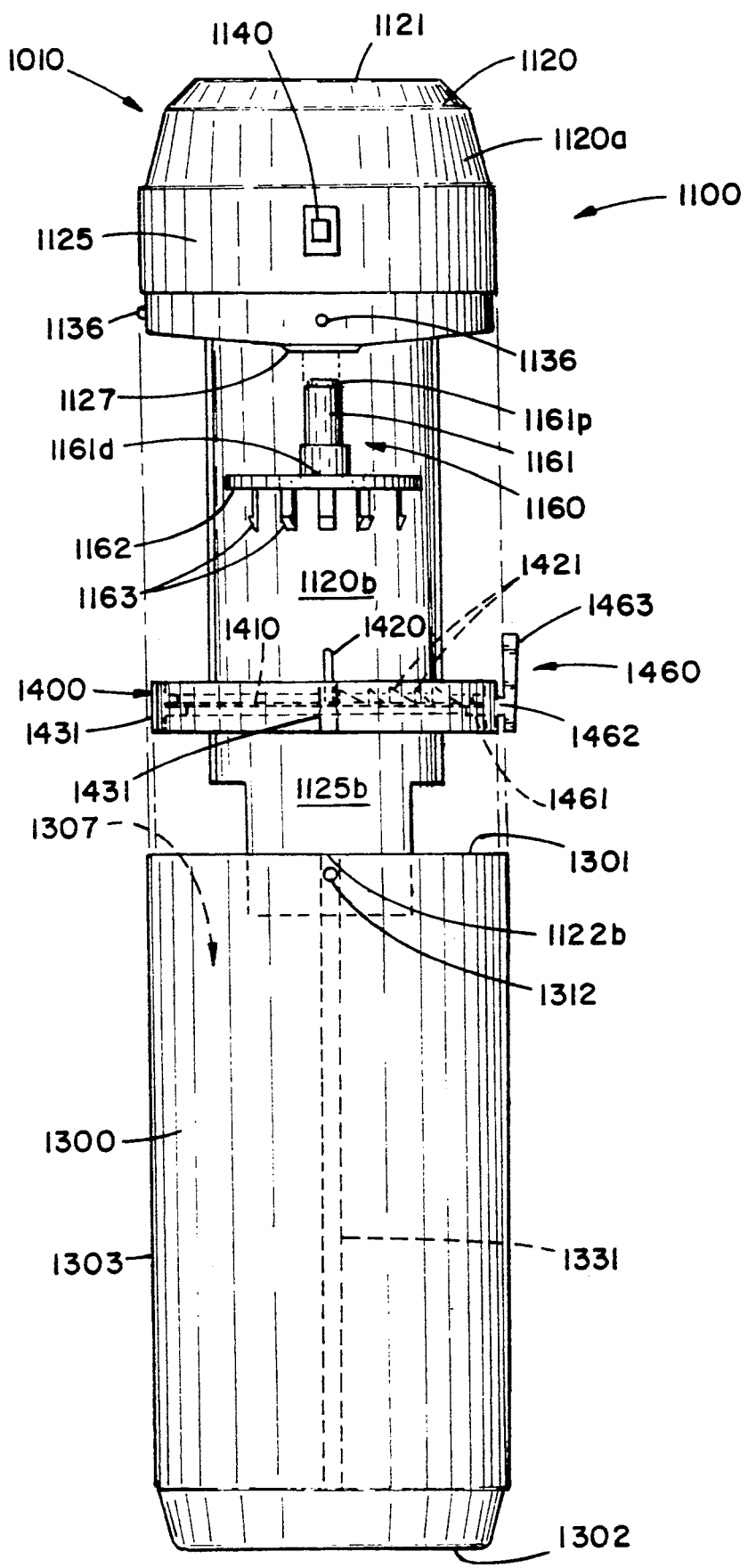
FIG. 7 is an exploded perspective view of the invention embodiment depicted in FIG. 5.
Figure 8:
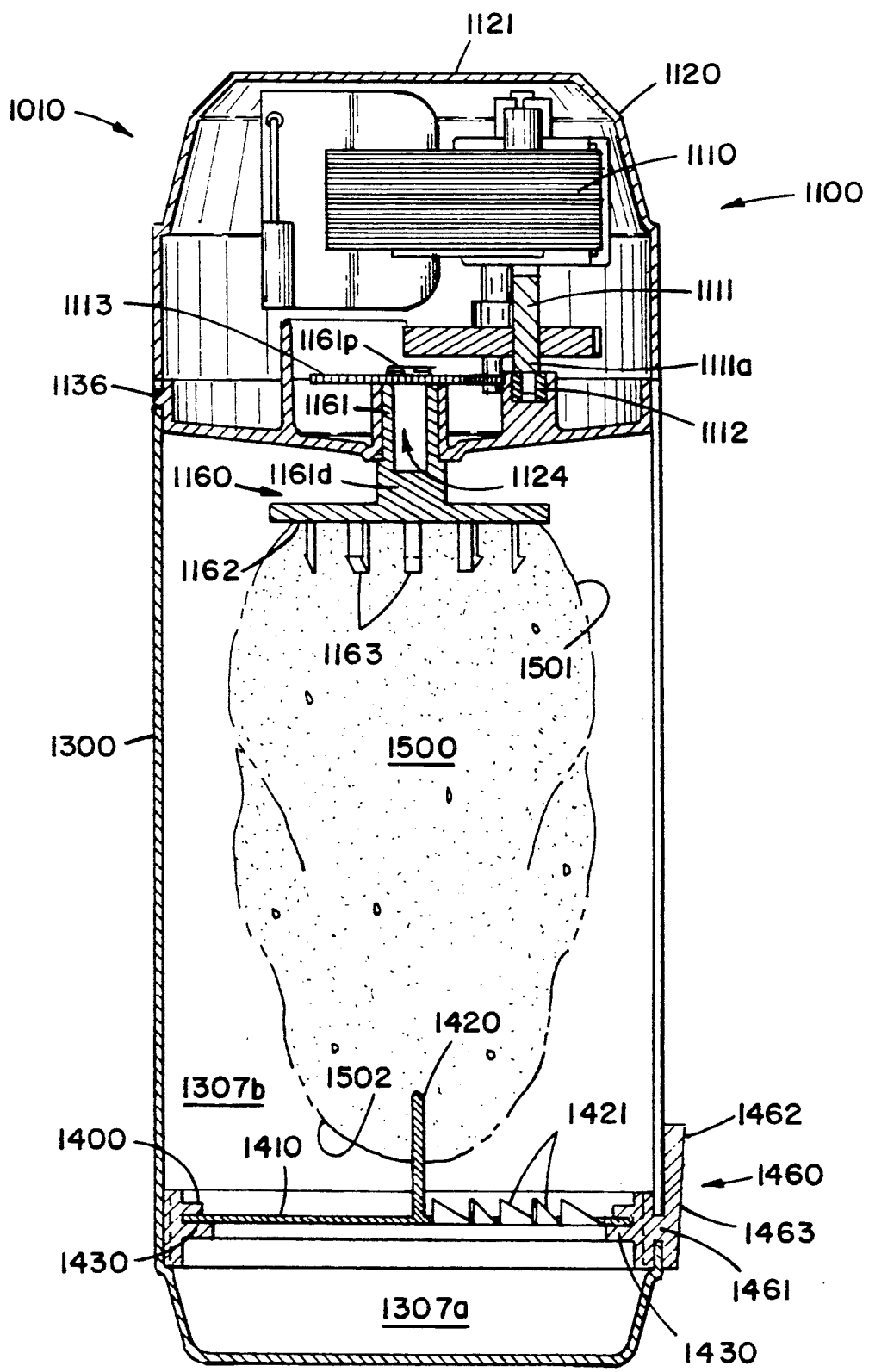
FIG. 8 is a cross-sectional side view of the invention embodiment depicted in FIG. 5.

Without intending to limit the scope of the invention, construction and operation of the various embodiments of the invention shall be described with respect to the spiral slicing of a potato to produce curly potato segments which may then be deep-fat fried to produce curly french fries.

First Embodiment

| | Nomenclature |
|---|---|
| 10 | appliance |
| 100 | motorized base |
| 110 | electric motor |
| 111 | motor shaft |
| 111d | distal end of motor shaft |
| 112 | drive shaft |
| 112d | distal end of drive shaft |
| 112p | proximal end of drive shaft |
| 113 | gear train |
| 114 | drive lug arrangement |
| 120 | housing |
| 121 | top of housing |
| 122 | bottom of housing |
| 125 | front of housing |
| 126 | back of housing |
| 130 | peripheral shoulder |
| 131 | horizontal portion of peripheral shoulder |
| 132 | vertical portion of peripheral shoulder |
| 135 | L-shaped projection |
| 140 | switch |
| 150 | cord |
| 200 | sleeve |
| 201 | top of sleeve |
| 202 | bottom of sleeve |
| 203 | sidewall of sleeve |
| 207 | retention compartment defined by sleeve |
| 210 | notches |
| 211 | bottom flange about notches |
| 213 | side flanges about notches |
| 220 | longitudinal channels |
| 230 | central orifice through bottom of sleeve |
| 240 | peripheral collar along bottom of sleeve |
| 241 | L-shaped channel |
| 250 | drive disc |
| 251a | upper portion of drive disc |
| 251b | central portion of drive disc |
| 251c | lower portion of drive disc |
| 252 | annular channel in central portion of drive disc |

-continued

| | Nomenclature |
|---|---|
| 253 | upwardly extending skewers on disc drive |
| 254 | downwardly extending tines on disc drive |
| 260 | retaining ring |
| 300 | hopper |
| 301 | top of hopper |
| 302 | bottom of hopper |
| 303 | sidewall of hopper |
| 307 | chamber defined by hopper |
| 310 | laterally extending tabs |
| 315 | depression in tabs |
| 320 | longitudinal ribs |
| 330 | slots |
| 340 | block between slot and bottom of hopper |
| 350 | guiding fingers |
| 400 | slicing blade assembly |
| 410 | disc |
| 420 | centering pin |
| 421 | longitudinal blades |
| 421w | linear distance between longitudinal blades |
| 422 | radial blade |
| 422d | depth of radial blade |
| 430 | holding collar |
| 440 | tabs |
| 440d | distal end of tabs |
| 441 | sloped projection |
| 442 | squared projection |
| 443 | channel defined by tabs |
| 450 | guiding slots |
| 500 | potato |
| 500' | sliced potato segments |
| 501 | top of potato |
| 502 | bottom of potato |

The first embodiment of the appliance 10 has four separate components: (i) a base 100, (ii) a sleeve 200, (iii) a hopper 300, and (iv) a slicing blade assembly 400.

The base includes an electric motor 110 surrounded by a housing 120. The housing 120 is generally shaped as a right circular cylinder with an on/off switch 140 protruding from the front 125 of the housing 120 and an electrical cord 150 projecting through the back 126 of the housing 120. The bottom 122 of the housing 120 is provided with four pads 160 for stabilizing the appliance 10 on smooth surfaces such as a counter top (not shown).

The top 121 of the housing 120 is configured to define a peripheral shoulder 130 which includes a horizontal portion 131 and a vertical portion 132. A pair of diametrically opposed, upside down, L-shaped projections extend outwardly from the vertical portion 132 of the peripheral shoulder 130 for retainably engaging the bottom 202 of the sleeve 200 in order to prevent rotation of the sleeve 200.

A central drive shaft 112 extends upward through the top 121 of the housing 120. The central drive shaft 112 is rotated by the motor shaft 111 through a gear train 113 which connects the distal end 111d of the motor shaft 111 to the proximal end 112p of the drive shaft 112. A drive lug arrangement 114 is provided at the distal end 112d4 of the drive shaft 112 operable for engaging a drive disc 250 rotatably retained within the bottom 202 of the sleeve 200 and transferring rotational power from the drive shaft 112 to the drive disc 250.

The sleeve 200 is substantially cylindrical and defines a retention compartment 207 which is accessible through the top 201 of the sleeve 200. A vertically extending, peripheral collar 240 is configured along the bottom 202 of the sleeve 200 for engaging the peripheral shoulder 130 on the base housing 120.

The sleeve 200 connects the hopper 300 to the base 100 so as to prevent rotation of the hopper 300 relative to the drive shaft 112 and serves to contain splattering of juices from the potato 500.

A pair of diametrically opposed, generally L-shaped channels 241 are provided along the inner surface of the peripheral collar 240. The channels 241 are configured for engaging the L-shaped projections 115 on the base housing 120 and secure the sleeve 200 to the base 100 and prevent rotation of the sleeve 200.

The bottom 202 of the sleeve 200 is upwardly concave to provide spacing between the top 121 of the base housing 120 and the bottom 202 of the sleeve 200 for accommodating the drive shaft 112.

A pair of diametrically opposed, substantially square notches 210 are provided at the top of the sleeve sidewall 203 for accommodating a pair of tabs 310 extending from the hopper 300 when the hopper 300 is inserted within the sleeve 200. A bottom flange 211 and pair of side flanges 213 are provided about the notches 210 for providing enlarged bearing surfaces for contacting the lateral tabs 310 on the hopper 300.

Extending downward from each of the notches 210 along substantially the entire length of the sleeve sidewall 203 is an inwardly open longitudinal channel 220. The longitudinal channels 220 are operable for accepting a pair of outwardly extending, diametrically opposed, longitudinal rib pairs 320 along the hopper sidewall 303 for preventing rotation of the hopper 300 relative to the sleeve 200 when any portion of the hopper 300 is placed within the sleeve 200.

The sleeve 200 includes a central orifice 230 in the bottom 202 of the sleeve 200 through which a drive disc 250 is rotatably secured by a retaining ring 260. An upper portion 251a of the drive disc 250 extends into the retention compartment 207 of the sleeve 200 while a lower portion 251c of the drive disc 250 extends into the cavity defined by the concave bottom 202 of the sleeve 200. The retaining ring 260 is secured within an annular channel 252 in the central portion 251b of the drive disc 250.

The lower portion 251c of the drive disc 250 has four peripherally spaced, downwardly projecting skewers 254 for engaging the drive lug arrangement 114 extending from the drive shaft 112 so as to transmit rotational energy from the drive shaft 112 to the drive disc 250.

The upper portion 251a of the drive disc 250 has four peripherally spaced, inwardly curved and upwardly projecting skewers 253 for penetrating into the bottom 502 of a potato 500 and thereby causing transference of rotational power from the drive shaft 112 to a potato 500 through the drive disc 250.

The hopper 300 is configured for telescoping reception within the retention compartment 207 of the sleeve 200 and defines a chamber 307 which is accessible through the top 301 of the hopper 300. The bottom 302 of the hopper 300 is defined by a slicing blade assembly 400 which includes downwardly extending blades 421,422 for slicing a potato 500 and a downwardly extending centering pin 420 for skewering the top 501 of a potato 500 in order to maintaining proper orientation of the potato 500 with respect to the blades 421,422 during slicing. Potato segments 500' produced by rotating a potato 500 against the blades 421,422 pass through the slicing blade assembly 400 and are retained within the chamber 307 defined by the hopper 300.

A pair of diametrically-opposed lateral tabs 310 extend outwardly from the top 30' of the hopper 300. The tabs 310 are configured and arranged so that the tabs 310 correspond with the notches 210 in the sleeve 200 for securing of the tabs 310 within the notches 210 when the hopper 300 is substantially completely within the retention compartment 207 of the sleeve 200. Downwardly concave depressions 315 are provided in each of the lateral tabs 310 for accommodating the thumbs (not shown) of a user during operation of the appliance 10.

Diametrically opposed longitudinal rib pairs 320 extend outwardly from the sidewall 303 of the hopper 300 from each of the tabs 310 to the bottom 302 of the hopper 300. The individual ribs in each rib pair 320 are configured and arranged in cooperation with the longitudinal channel 220 in the sleeve 200 such that the rib pairs 320 may be longitudinal slid within the longitudinal channels 220 for preventing rotational movement of the hopper 300 relative to the sleeve 200.

The sidewall 303 of the hopper 300 has a pair of diametrically opposed slots 330 proximate the bottom 302 of the hopper 300 for accepting a laterally extending sloped projection 441 on the slicing blade assembly 400 and thereby securing the slicing blade assembly 400 to the hopper 300.

Referring to FIGS. 2 and 4, a slicing blade assembly 400 is depicted which is capable of helically slicing a fruit or vegetable. The slicing blade 5 radially spaced longitudinally extending blades 421 for slicing a potato 500 rotated against the blade assembly 400 int annular strips from the center of the potato 500 toward the periphery of the potato 500 and a single radially extending blade 422 for helically cutting the potato 500 from top 501 to bottom 502 after the longitudinal blades 421 have cut the potato 500 into annular strips. The blades disc 410 is secured within a holding collar 430.

The slicing blade assembly 400 includes a pair of diametrically opposed tabs 440 which extend laterally from the holding collar 430. Each tabs 440 includes an outwardly extending sloped projection 441 near the longitudinal center (unnumbered) of the tab 440 and an outwardly extending squared projection 442 proximate the distal end 440d of the tab 440. The sloped face (unnumbered) of the sloped projection 441 facilitates insertion of the projection 441 on the blade assembly 400 into the slot 330 in the hopper 300 for securing the slicing blade assembly 400 in position proximate the bottom 302 of the hopper 300. The sloped projection 441 and the squared projection 442 define an outwardly open channel 443 between them for accepting the block of material 340 between the slot 330 and the bottom 302 of the hopper and securing the blade assembly 400 in position.

A pair of longitudinally elongated, diametrically opposed guiding slots 450 are provided through the periphery of the collar 430 on the slicing blade assembly 400 for engaging a pair of longitudinally elongated, diametrically opposed guiding fingers 350 on the side of the hopper sidewall 303. The guiding slots 450 and fingers 350 cooperate to prevent attachment of the slicing blade assembly 400 to the hopper 300 unless they are properly oriented with respect to one another.

The slicing blade assembly 400 may be readily detached from the hopper 300 for permitting changing of the slicing blade assembly 400 by simply forcing the distal end 440d of the tabs 440 inward until the sloped projections 441 on both tabs 440 disengage the block of material 340 on the hopper 300.

Second Embodiment

| Nomenclature | |
|---|---|
| 1010 | second embodiment of appliance |
| 1100 | power assembly |
| 1110 | electric motor |
| 1111 | motor shaft |
| 1111d | distal end of motor shaft |
| 1112 | motor gear |
| 1113 | disc gear |
| 1120 | housing |
| 1120a | primary section of housing |
| 1120b | appendage portion of housing |
| 1121 | top of housing |
| 1122a | bottom of primary section |
| 1122b | bottom of appendage portion |
| 1124b | lateral ends of appendage portion |
| 1125a | front of primary section |
| 1125b | front of appendage portion |
| 1126 | back of housing |
| 1127 | central orifice through bottom of primary section |
| 1128 | mounting arrangement |
| 1130 | peripheral shoulder |
| 1131 | horizontal portion of peripheral shoulder |
| 1132 | vertical portion of peripheral shoulder |
| 1136 | coupling spheres |
| 1140 | switch |
| 1150 | cord |
| 1160 | drive disc |
| 1161 | drive disc shaft |
| 1161p | proximal portion of drive disc shaft |
| 1161d | distal portion of drive disc shaft |
| 1162 | base plate |
| 1163 | tines on base plate |
| 1171 | mounting brackets |
| 1172 | mounting screws |
| 1300 | container |
| 1301 | top of container |
| 1302 | bottom of container |
| 1303 | sidewall of container |
| 1304 | external ribs |
| 1307 | retention compartment defined by container |
| 1307a | upper portion of retention compartment |
| 1307b | lower portion retention compartment |
| 1311 | longitudinal slit |
| 1312 | holes for coupling spheres |
| 1331 | longitudinal guiding grooves |
| 1400 | slicing blade assembly |
| 1410 | disc |
| 1420 | centering pin |
| 1421 | longitudinal blades |
| 1421w | linear distance between longitudinal blades |
| 1422 | radial blade |
| 1430 | holding collar |
| 1431 | longitudinal guiding ribs |
| 1460 | control knob |
| 1461 | extension shaft |
| 1462 | thumb pad of control knob |
| 1500 | potato |
| 1500' | sliced potato segments |
| 1501 | top of potato |
| 1502 | bottom of potato |
| 1600 | worm gear |
| 1600p | proximal end of worm gear |
| 1600d | distal end of worm gear |
| 1611 | pinion |
| 1612 | gear wheel |
| 1630 | rack |

The second embodiment of the appliance 1010 has four separate components including (i) a power assembly 1100, (ii) a drive disk 1160, (iii) a container 1300, and (iv) a blade assembly 1400.

The power assembly 1100 includes a housing 1120 with a primary section 1120a for retaining an electric motor 1110 and a longitudinal appendage 1120b extending along the back 1126 of the housing 1120 for facilitating along the back 1126 of the housing 1120 for facilitating mounting of the appliance 1010 to a vertical wall (unnumbered) and securing the container 1300 to the housing 1120. An electrical cord 1150 extends through the back 1126 of the housing 1120 and an on/off switch 1140 protrudes from the front 1125a of the primary section 1120a of the housing 1120.

The bottom 1122a of the primary section 1120a of the housing 1120 is shaped to define a peripheral shoulder 1130 which includes a horizontal portion 1131 and a vertical portion 1132. A plurality of coupling spheres 1136 are spaced along the vertical portion 1132 of the peripheral shoulder 1130 for retainably engaging the to 1301 of the container 1300.

A drive disc 1160 extends downward through a central orifice 1127 in the bottom 1122a of the primary section 1122a of the housing 1120. The drive disc 1160 includes a shaft 1161 which extends through the housing 1120 and a base plate 1162 coupled to the distal end 1161d of the shaft 1161. The proximal end 1160p of the drive disc 1160 extends into the housing 1120 and is rotatably connected to the distal end 1111d of the motor shaft 1111 through a disc gear 1113. The drive disc 1160 may be releasably engaged to the disc gear 1113 by any convenient method which does not interfere with the translation of rotational power from the motor 1110 to the drive disc 1160 so that the drive disc 1160 may be separated from the power assembly 1100 for cleaning. Several peripheral tines 1163 extend downward from the base plate 1162 for penetrating the top 1501 of a potato 1500 so as to facilitate the transference of rotational power from the drive disc 1160 to the potato 1500.

The back 1126 of the housing 1120 includes a pair of longitudinally spaced mounting arragements 1128 which cooperate with a pair of mounting brackets 1171 attachable to a surface (unnumbered) with screws 1172 for securing the power assembly 1100 to a wall.

The appendage portion 1120b of the housing 1120 extends nearly the entire length of the container 1300 when the container 1300 is operably coupled to the power assembly 1100. The front 1125b of the appendage portion 1120b of the housing 1120 defines a longitudinally elongated concave surface which is configured and arranged to mate with the container 1300 in order to facilitate alignment and bracing of the container 1300 during operation of the appliance 1010.

The container 1300 is substantially cylindrical in shape and defines a cylindrical retention compartment 1307 which is accessible through the top 1301 of the container 1300. A plurality of peripherally spaced holes 1312 extend through the sidewall 1303 of the container 1300 proximate the top 1301 of the container 1300 for accommodating the coupling spheres 1136 which extend from the vertical portion 1132 of the peripheral shoulder 1130.

A pair of longitudinally extending ribs 1304 extend externally from the sidewall 1303 of the container 1300 for abutting the lateral ends 1124b of the appendage portion 1120b of the housing 1120 when the container 1300 is coupled to the power assembly 1100. The ribs 1304 facilitate alignment of the container 1300 on the housing 1120 and prevent rotation of the container 1300 relative to the power assembly 1100.

A longitudinal slit 1311 extends from top 1301 to bottom 1302 through the sidewall 1303 of the container 1300. The longitudinal slit 1311 accommodates passage of a control knob 1460 connected to the blade assembly 1400 within the container 1300 so as to permit manual movement of the blade assembly 1400 within the container 1300.

A plurality of longitudinal guiding grooves 1331 extend internally along the sidewall 1303 of the container 1300 for accommodating longitudinal guiding ribs 1431 which extend externally along the collar 1430 of the blade assembly 1400. The combination of longitudinal guiding grooves 1331 and longitudinal guiding ribs 1431 maintain the horizontal position of the blade assembly 1400 within the container 1300 and prevent rotation of the blade assembly 1400 during operation of the appliance 1010.

The blade assembly 1400 includes a blade disc 1410 secured within a holding collar 1430. The blade assembly 1400 is configured and arranged for reciprocable retention within the retention compartment 1307 of the container 1300. As mentioned previously, a plurality of longitudinally extending guiding ribs 1431 extend externally from the collar 1430 for cooperating with the longitudinally extending guiding slot 1451 in the container 1300 to maintain the horizontal position of the blase assembly 1400 and prevent the blade assembly 1400 from rotating during operation of the appliance 1010.

The blade assembly 1400 includes a blade disc 1410 secured within a holding collar 1430. The holding collar 1430 is configured and arranged for permitting longitudinal reciprocation of the blade assembly 1400 within the retention compartment 1307 of the container 1300. A plurality of longitudinally extending guiding ribs 1431 extend externally from the periphery of the collar 1430 for retention within the longitudinally extending guiding grooves 1451 in the container 1300.

A laterally extending control knob 1460 is integrally coupled to the holding collar 1430 by an extension shaft 1461 which extends through the longitudinal slit 1311 in the sidewall 1303 of the container 1300. A thumb pad 1462 is coupled to the extension shaft 1461 outside of the container 1300 for permitting manual movement of the blade assembly 1400 within the container 1300.

The blade disc 1410 is configured for producing helical strips and includes a plurality of radially separated longitudinally extending blades 1421 and a single longitudinally gaped radially extending blade 1422. In operation, the longitudinally extending blades 1421 vertically slice the uppermost portion of the potato 1500 into concentric rings and then the radially extending blade 1422 horizontally slices the concentric rings in a continuous helical fashion. The blade disc 1410 also includes a centering pin 1420 for penetrating and retaining the potato 1500 in proper orientation with respect to the blade disc 1410 and for preventing the blades 1421,1422 from contacting the tines 1163 on the drive disc 1160.

The blade assembly 1400 divides the retention compartment 1307 defined by the container 1300 into an upper portion 1307a in which the whole potato 1500 is retained and a lower portion 1307b in which the sliced potato 1500' is retained. As is apparent, the sizes of the upper 1307a and lower 1307b retention compartments change inversely to one another as the blade assembly 1400 moves upward and slices additional potato 1500.

Alternate Second Embodiment

Figure 9:
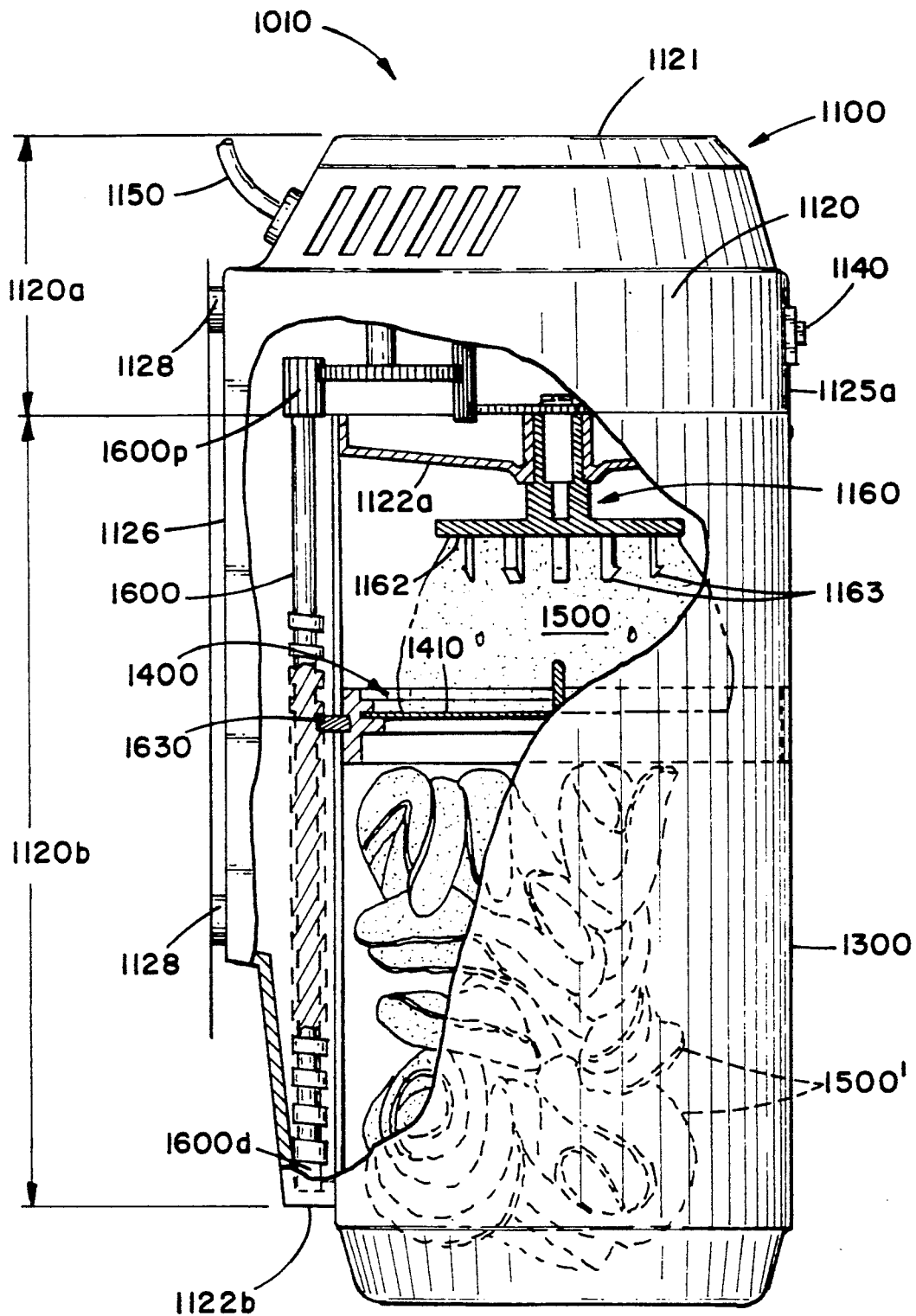
FIG. 9 is a side view of an alternative second embodiment of the invention with a portion thereof broken-away to facilitate illustration of various internal mechanisms.

Referring to FIG. 9, an alternate version of the second embodiment of the appliance 1010 provides automatic longitudinal movement of the blade assembly 1400. The electric motor 1110 supplies the power for moving the blade assembly 1400 by means of a gear train (unnumbered) which extends from the disc gear 1113 into the appendage portion 1120b of the housing 1120. The gear train includes (-) a pinion 1611 rotationally driven by the disc gear 1113, (-) a gear wheel 1612 rotationally driven by the pinion 1611, (-) a worm gear 1600 rotationally driven at the proximal end 1600p by the gear wheel 1612, and (-) a rack 1630 longitudinally driven by the worm gear 1600. The threading of the worm gear 1600 terminates a sufficient distance from the proximal end 1600p of the worm gear 1600 to prevent continued movement of the blade assembly 1400 into contact with the drive disc 1160.

The rack 1630 is integrally coupled to the holding collar 1430 of the blade assembly 1400 and communicates with the worm gear 1600 through aligned longitudinal slits in the container 1311 and the front 1125b of the appendage portion 1120b of the housing 1120. The longitudinal slit 1311 in the container 1300 for use in the alternative embodiment must be positioned between the external longitudinal ribs 1304 on the container 1300 in order to permit communication between the worm gear 1600 and the rack 1630.

All Embodiments

The components of both embodiments including the base 100, drive disk 160, container 300, and blade assembly 400 of the first embodiment and the housing 1120, drive disc 1160, container 1300, and blade assembly 1400 of the second embodiment may be constructed from any material possessing sufficient structural integrity, including: plastics such as polyvinyl chloride, polycarbonate, nylon, and polyester; and metals such as steel and aluminum. Preferably the base 100, drive disk 160, container 300, and holding collar 430 of the first embodiment and the housing 1120, drive disc 1160, container 1300, and holding collar 1430 of the second embodiment are molded from plastics because of the low cost and durability of such materials. The blade discs 410 and 1410 are preferably constructed from steel because of the substantial forces placed upon the blades 421,422, and 1421,1422. The blades 421,422, and 1421,1422 may be conveniently formed by simply cutting and bending a metal sheet to project the desired cutting edges from the sheet.

The electric motor 110 and 1110 are preferably about a 7 to 8 inch-ounce torque output motor capable of rotating a potato 500,1500 at about 50 to 60 rpm against the blades 421.422 and 1421,1422.

The depth 422d and 1422d of the radially extending blade 422,1422 controls the thickness of the spiral slices 1500' while the radial spacing 421w and 1421w provided between the longitudinally extending blades 1421 controls the width of the spiral slices 1500'.

The entire appliance 10 and 1010 can be constructed to any desired size. A hopper 300 and container 1300 volume of about 0.25 to 2 liters is good for slicing smaller fruits and vegetables in a household setting while a hopper 300 container 1300 volume of about 0.5 to 4 liters is good for slicing larger fruits and vegetables in a commercial setting.

Blade Assemblies

| Nomenclature | |
|---|---|
| 2400 | coring/slicing blade assembly |
| 2410 | disc |
| 2411 | central orifice through disc |
| 2412 | outer periphery of disc |

-continued

| Nomenclature | |
|---|---|
| 2413 | inner periphery of disc |
| 2421 | longitudinal blades |
| 2422 | radial blade |
| 2422d | depth of radial blade |
| 2430 | holding collar |
| 2440 | tabs |
| 2440d | distal end of tabs |
| 2441 | sloped projection |
| 2442 | squared projection |
| 2443 | channel defined by tabs |
| 2450 | guiding slots |
| 3400 | grating blade assembly |
| 3410 | disc |
| 3411 | centering pin |
| 3412 | outer periphery of disc |
| 3421 | circular blades |
| 3430 | holding collar |
| 3440 | tabs |
| 3440d | distal end of tabs |
| 3441 | sloped projection |
| 3442 | squared projection |
| 3450 | guiding slots |

The blade assembly 400 and 1400 utilized in the various embodiments of the invention may be readily interchanged. Two other blades which may be utilized in the present invention in addition to the slicing blade assembly 400 and 1400 depicted in FIGS. 1-9 include a coring and slicing blade assembly 2400 and a grating blade assembly 3400.

Figure 10:
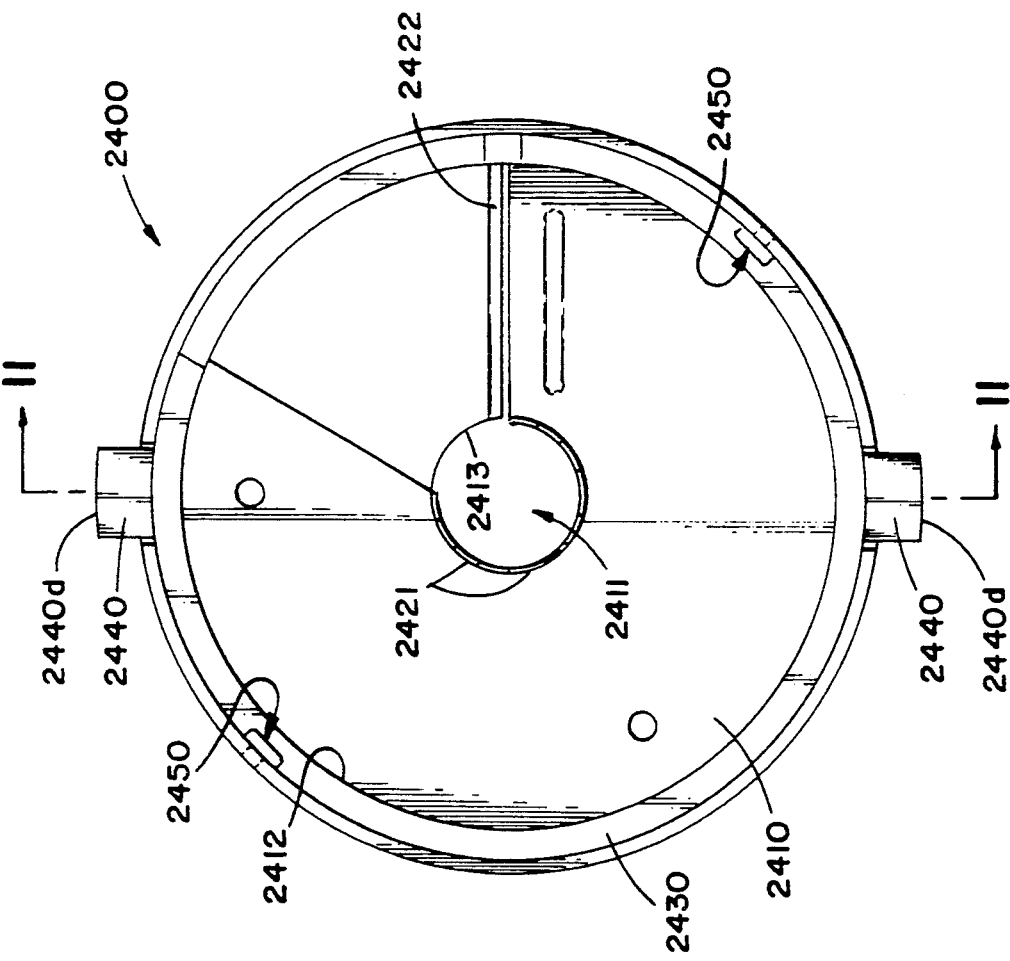
FIG. 10 is a top view of a combination coring/slicing blade assembly useful in the present invention.
Figure 11:
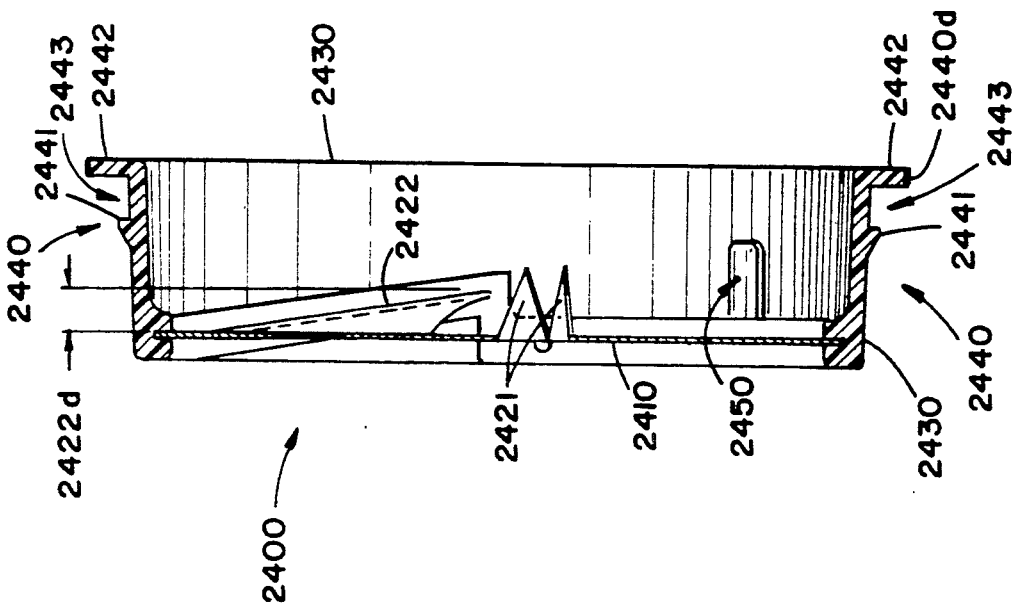
FIG. 11 is a side view of the combination coring/slicing blade depicted in FIG. 10.

Referring to FIGS. 10 and 11, a coring and slicing blade assembly 2400 is depicted which is capable of simultaneously coring and helically slicing produce. The coring/slicing blade assembly 2400 is similar to the slicing blade assembly 400,1400 except for the addition of a central orifice 2411 where the centering pin 420 was located and the configuration of the blades 2421,2422 on the blade disc 2410. The blade disc 2410 of the coring/slicing blade assembly 2400 includes (-) a central orifice 2411 defining an inner periphery 2413, (-) a plurality of longitudinally extending blades 2421 circumscribing the inner periphery 2413, and (-) a longitudinally gaped radially extending blade 2422 which extends outward from the inner periphery 2413 to the outer periphery 2412 of the blade disc 2410. The longitudinally extending blades 2421 cut a cylindrical core from produce rotated against the blade assemble 2400 which then passes as single piece through the central orifice 2411 in the blade disc 2410. The remainder of the produce is helically sliced by the radially extending blade 1422.

Referring to FIG. 12, a grating blade assembly 3400 is depicted which is capable of grating produce. The grating blade assembly 3400 is similar to the slicing blade assembly 400,1400 except for the configuration of the blades 3421 on the blade disc 3410. The blade disc 3410 of the grating blade assembly 3400 includes a plurality of radially spaced longitudinally gaped circular blades 3421 for grating produce.

Operation

First Embodiment

Use of the first embodiment of the appliance 10 to slice a potato 500 simply requires the steps of (i) setting the base 100 upon a flat surface (not shown), (ii) plugging the cord 150 into an electric receptacle( not shown), (iii) securing the sleeve 200 upon the base 100 by aligning, inserting and rotating the L-shaped projection 115 on the base 100 into the L-shaped channel 241 on the sleeve 200, (iv) skewering the bottom 502 of a potato 500 onto the upwardly extending skewers 253 on the drive disc 250, (v) aligning the longitudinal rib pairs 320 on the hopper 300 with the longitudinal channels 220 in the sleeve 200, (vi) sliding the hopper 300 into the retention compartment 207 of the sleeve 200 until the centering pin 420 on the slicing blade assembly 400 penetrates into the top 501 of the potato 500 and the top 501 of the potato 500 contacts the blades 421,422, (vii) applying downward pressure upon the hopper 300 by grasping the lateral tabs 310 on the hopper 300 and pushing or pulling the hopper 300 towards the base 100, and, (viii) rotating the potato 500 against the blades 421,422 while maintaining downward pressure upon the hopper 300 against the potato 500 by flicking switch 140 to the on position.

Continued downward movement of the hopper 300 within the retention compartment 207 of the sleeve 200 is prevented prior to contact between the stationary slicing blade assembly 400 and the rotating drive disc 250. Accordingly, a bottom portion 502 of the potato 500 will generally remain unsliced within the retention compartment 207 after completion of the slicing operation.

Separability of the base 100, sleeve 200, hopper 300, and slicing blade assembly 400 facilitates cleaning of the appliance 10 and reduces the possibility that the bas 100 will be accidentally submersed in water.

Second Embodiment

Use of the second embodiment of the appliance 1010 to slice a potato 1500 simply requires the steps of (i) positioning and attaching the mounting brackets 1171 to a wall with the screws 1172, (ii) mounting the power assembly 1100 to the mounting brackets 1171, (iii) plugging the electrical cord 1150 extending from the power assembly 1100 into an electrical receptacle (not shown), (iv) sliding the blade assembly 1400 into the container 1300 by aligning the extension shaft 1461 on the blade assembly 1400 with the longitudinal slit 1311 in the container 1300 and the longitudinal guiding ribs 1431 on the blade assembly 1400 with the longitudinal guiding grooves 1331 in the container 1300, (v) attaching the drive disc 1160 to the power assembly 1100, (vi) skewering the potato 1500 onto the tines 1163 of the drive disc 1160, (vii) attaching the container 1300 to the power assembly 1100 by aligning the appendage portion 1120b of the housing 1120 between the longitudinal ribs 1304 on the contaner 1300 and snapping the coupling spheres 1136 on the vertical portion 1132 of the peripheral shoulder into the holes 1312 proximate the top 1301 of the container 1300, (viii) ensuring that the potato 1500 remained skewered on the tines 1163 and in a substantially vertical position while the container 1300 was attached to the power assembly 1100, (ix) pressing the on/off switch 1140 to initiate rotation of the potato 1500, (x) manually moving the blade assembly 1400 upward into slicing contact with the potato 1500 using the control knob 1460, (xi) continuing movement of the blade assembly 1400 through potato 1500 until upward movement is prevented, (xii) pressing the on/off switch to stop rotation of the drive disc 1160, (xiii) detaching the container 1300 containing the sliced potato 1500' from the power assembly 1100 by pulling down on the container 1300, and (xiv) sliding the blade assembly 1400 from inside the container 1300 while leaving the sliced potato 1500 within the container 1300.

Operation of the alternative version of the second embodiment parallels operation of the primary embodiment except that steps (x) and (xi) are unnecessary as they are performed automatically once the on/off switch is pressed in step (ix).

Separability of the power assembly 1100, drive disk 1160, container 1300, and blade assembly 1400 facilitates cleaning of the appliance 1010 and reduces the possibility that the electric motor 1110 will be accidentally submersed in water.

The specification is provided to aid in the complete nonlimiting understanding of the invention. Since many variations and embodiments of the invention may be created without departing from the spirit and scope of the invention, the scope of the invention resides in the claims hereinafter appended.

I claim:

1. A device for slicing produce which comprises:
   a container defining a retention compartment configured and arranged for retention of an article of produce;
   means for rotating the article of produce retained within the container, said means for rotating fixed from longitudinal movement relative to said container;
   a longitudinally reciprocable blade assembly positioned within said retention compartment for sliding the article of produce retained within the retention compartment as the article of produce is rotated by said rotating means and the blade assembly is longitudinally propelled against the article of produce; and
   means for longitudinally moving said blade assembly relative to said container to slice the article of produce wherein the sliced article of produce passes through said blade assembly as said blade assembly is longitudinally moved.

2. The device of claim 1 wherein the container and the blade assembly are operable for substantially instantaneous disconnection from the rotating means so as to facilitate cleaning of the container and blade assembly.

3. The device of claim 1 wherein the container and the blade assembly are separate components which are operable for substantially instantaneous disconnection from each other so as to facilitate changing and cleaning of the blade assembly.

4. The device of claim 1 further comprising linking means for connecting the means for rotating the article of produce to the means for longitudinally moving said blade assembly, wherein the means for rotating the article of produce further propels the blade assembly against the article of produce.

5. A device for slicing an article of produce comprising:
   a container arrangement defining a first compartment configured and arranged for retention of said article of produce;
   means for rotating said article of produce retained within said first compartment, said means for rotating fixed from longitudinal movement relative to said first compartment;
   a longitudinally reciprocable blade assembly for slicing said article of produce retained within said first compartment as said article of produce is rotated by said means for rotating and said blade assembly is longitudinally propelled against said article of produce;

means for longitudinally moving said blade assembly relative to said first compartment to slice said article of produce wherein said sliced article of produce passes through said blade assembly as said blade assembly is longitudinally moved; and said container arrangement defining a second compartment for receiving said sliced article of produce passing through said blade assembly.

6. The device of claim 5, further comprising linking means for connecting said means for rotating said article of produce to said means for longitudinally moving said blade assembly, wherein said means for rotating said article of produce further propels aid blade assembly against said article of produce.

7. A device for slicing produce comprising:

a frame;

rotating means for rotating an article of produce about an axis of rotation, said rotating means fixed from longitudinal movement along said axis of rotation relative to a first portion of said frame;

a longitudinally reciprocable blade assembly for slicing said article of produce as said article of produce is rotated and said blade assembly is propelled longitudinally in a direction of said axis of rotation against said article of produce;

means for longitudinally moving said blade assembly relative to said first portion of said frame with said article of produce passing through said blade assembly as said article of produce is sliced by said longitudinally moving blade assembly; and said frame including a second portion defining a compartment for receiving and retaining said sliced article of produce passing through said blade assembly.

8. The device of claim 7, further comprising linking means for connecting said means for rotating said article of produce to said means for longitudinally moving said blade assembly, wherein said means for rotating said article of produce further propels said blade assembly against said article of produce.

* * * * *

UNITED STATES PATENT AND TRADEMARK OFFICE
CERTIFICATE OF CORRECTION

PATENT NO. : 5,138,940
DATED : August 18, 1992
INVENTOR(S) : Geissler et al.

It is certified that error appears in the above-identified patent and that said Letters Patent is hereby corrected as shown below:

```
In the ABSTRACT, line 12
    DELETE "propeled" and INSERT therefor
    --propelled--

Column 1, line 6
    DELETE "07/55,042" and INSERT therefor
    --07/555,042--.

Column 3, line 27
    DELETE "(-)" and INSERT therefor --(i)--.

Column 3, line 33
    DELETE "(-)" and INSERT therefor --(iii)--.

Column 3, line 58
    DELETE "(-)" and INSERT therefor --(i)--.

Column 3, line 59
    DELETE "(-)" and INSERT therefor --(ii)--.

Column 3, line 60
    DELETE "(-)" and INSERT therefor --(iii)--.

Column 6, line 59
    DELETE "maintaining" and INSERT therefor
    --maintain--.

Column 6, line 66
    DELETE "30'" and INSERT therefor --301--.
```

UNITED STATES PATENT AND TRADEMARK OFFICE
CERTIFICATE OF CORRECTION

PATENT NO. : 5,138,940

DATED : August 18, 1992

INVENTOR(S) : Geissler et al.

It is certified that error appears in the above-identified patent and that said Letters Patent is hereby corrected as shown below:

Column 7, line 14
   DELETE "longitudinal" and INSERT therefor --longitudinally--.

Column 7, line 27
   DELETE "int" and INSERT therefor --into--.

Column 7, line 37
   DELETE "tabs" and INSERT therefor --tab--.

Column 7, line 57
   DELETE "side" and INSERT therefor --inside--.

Column 8, lines 67 and 68
   DELETE "along the back 1126 of the housing 1120 for facilitating" after the word "facilitating".

Column 9, line 11
   DELETE "to" and INSERT therefor --top--.

Column 10, line 20
   DELETE "slot" and INSERT therefor --slots--.

Column 10, line 22
   DELETE "blase" and INSERT therefor --blade--.

Column 11, line 3
   DELETE "(-)" and INSERT therefor --(i)--.

UNITED STATES PATENT AND TRADEMARK OFFICE
CERTIFICATE OF CORRECTION

PATENT NO. : 5,138,940　　　　　　　　　　　　Page 3 of 5
DATED : August 18, 1992
INVENTOR(S) : Geissler et al.

It is certified that error appears in the above-identified patent and that said Letters Patent is hereby corrected as shown below:

Column 11, line 4
　　　　DELETE "(-)" and INSERT therefor --(ii)--.

Column 11, line 5
　　　　DELETE "(-)" and INSERT therefor --(iii)--.

Column 11, line 7
　　　　DELETE "(-)" and INSERT therefor --(iv)--.

Column 11, line 26
　　　　DELETE "drive disk 160" and INSERT therefor --drive disc 250--.

Column 11, line 26
　　　　DELETE "container 300," and INSERT therefor --hopper 300,--.

Column 11, line 33
　　　　DELETE "drive disk 160" and INSERT therefor --drive disc 250,--

Column 11, line 34
　　　　DELETE "container 300," and INSERT therefor --hopper 300,--.

Column 11, line 34
　　　　DELETE "holding collar 1430" and INSERT therefor --holding collar 430--.

UNITED STATES PATENT AND TRADEMARK OFFICE
CERTIFICATE OF CORRECTION

PATENT NO : 5,138,940
DATED : August 18, 1992
INVENTOR(S) : Geissler et al.

It is certified that error appears in the above-identified patent and that said Letters Patent is hereby corrected as shown below:

```
Column 11, line 49
    DELETE "1422d" and INSERT therefor --1422--.

Column 12, line 38
    DELETE "(-)" and INSERT therefor --(i)--.

Column 12, line 39
    DELETE "(-)" and INSERT therefor --(ii)--.

Column 12, lien 41
    DELETE "(-)" and INSERT therefor --(iii)--.

Column 12, line 47
    INSERT --a-- after the word "as".

Column 13, line 28
    DELETE "bas" and INSERT therefor --base--.

Column 13, line 68
    DELETE "1500" and INSERT therefor --1500'--.

Column 14, lines 27 and 28 (claim 1)
    DELETE "sliding" and INSERT therefor --slicing--.
```

UNITED STATES PATENT AND TRADEMARK OFFICE
CERTIFICATE OF CORRECTION

PATENT NO. : 5,138,940
DATED : August 18, 1992
INVENTOR(S) : Geissler, et al.

It is certified that error appears in the above-indentified patent and that said Letters Patent is hereby corrected as shown below:

Column 14, lines 27 and 28 (claim1) delete "sliding" and insert --slicing--.

Signed and Sealed this

Nineteenth Day of October, 1993

Attest:

BRUCE LEHMAN

*Attesting Officer*  *Commissioner of Patents and Trademarks*